(12) United States Patent
Chan et al.

(10) Patent No.: US 7,516,448 B1
(45) Date of Patent: Apr. 7, 2009

(54) METHOD FOR IMPROVING IRREDUCIBLE REGION COMMONING COMPILE SPEED

(75) Inventors: Siu Chi Chan, Toronto (CA); Ronald Ian McIntosh, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/165,403

(22) Filed: Jun. 30, 2008

(51) Int. Cl.
*G06F 9/45* (2006.01)
(52) U.S. Cl. .................. 717/155; 717/140; 717/151; 717/154
(58) Field of Classification Search .............. 717/140, 717/151–161; 714/37, 38
See application file for complete search history.

(56) References Cited

U.S. PATENT DOCUMENTS

| | | | | |
|---|---|---|---|---|
| 5,452,461 A | * | 9/1995 | Umekita et al. | 717/149 |
| 5,530,866 A | * | 6/1996 | Koblenz et al. | 717/144 |
| 5,561,803 A | * | 10/1996 | Kilis | 717/159 |
| 5,835,776 A | * | 11/1998 | Tirumalai et al. | 717/161 |
| 6,032,252 A | * | 2/2000 | Petro et al. | 712/233 |
| 6,163,882 A | * | 12/2000 | Masuyama et al. | 717/154 |
| 6,286,135 B1 | * | 9/2001 | Santhanam | 717/146 |
| 6,412,107 B1 | * | 6/2002 | Cyran et al. | 717/148 |
| 6,415,433 B1 | * | 7/2002 | Callahan et al. | 717/160 |
| 6,772,415 B1 | * | 8/2004 | Danckaert et al. | 717/161 |
| 7,168,070 B2 | * | 1/2007 | Archambault et al. | 717/151 |
| 7,225,438 B2 | * | 5/2007 | Hostetter et al. | 717/148 |

OTHER PUBLICATIONS

Davidon et al., "Evaluation of Step Directions in Optimization Algorithms," Mar. 1985, ACM, pp. 12-19.*
Havlak, Paul, "Nesting of Reducible and Irreducible Loops," Jul. 1997, ACM, pp. 557-567.*
Saitou et al., "Dominance Analysis of Irreducible CFGs by Reduction," Apr. 2005, ACM, pp. 10-19.*
Handling Irreducible Loops: Optimized Node Splitting versus DJ-Graphs, Unger et al., ACM Transactions on Programming Languages and Systems, vol. 24, No. 4, Jul. 2002, pp. 299-333.
Unger, et al, Handling Irreducible Loops: Optimized Node Splitting versus DJ-Graphs,., ACM Transactions on Programming Languages and Systems, vol. 24, No. 4, Jul. 2002, pp. 299-333.
Cook, et al, ECE497MFFinal Report: The Formation and Simulation of a Whole Program Gated Singular Assignment Program Dependence Graph, Unconventional Computer Architecture Group, UIUC, no date.
Cooper, et al, Interactive Data-Flow Analysis, Revisited, Nov. 2002.

* cited by examiner

*Primary Examiner*—Wei Y. Zhen
*Assistant Examiner*—Qing Chen
(74) *Attorney, Agent, or Firm*—Shimokaji & Associates, PC

(57) ABSTRACT

A method for improving compile speed in irreducible code regions within a computer program is disclosed. The method comprises determining which of a plurality of code regions within a computer program is irreducible, determining an influence of the irreducible code on blocks within code regions, determining a direction of processing based on the influence of the irreducible code on adjacent blocks and performing a processing based on a current direction of processing and the determined direction of processing.

1 Claim, 3 Drawing Sheets

METHOD FOR IMPROVING IRREDUCIBLE REGION COMMONING COMPILE SPEED

BACKGROUND OF THE INVENTION

The present invention is related to the field of computer programming and more particularly with regard to a method and apparatus for improving irreducible region commoning compile speed.

In computer programming loops are well-known logic devices to perform similar operations for a known number of times. A region within a program is either a loop or an entire procedure. Most regions are reducible, with a single entry point. Some regions are referred to as irreducible, with multiple places at which they can be entered. In most programs all or nearly all regions are reducible. One exception is that in some implementations of exception handling (e.g., C++ try/throw/catch) the exception-handling code appears as an alternate entry into the region.

Program translators (i.e., compilers) usually include optimizers, and one of the normal optimizations is some variant of common expression elimination, code motion, or partial redundancy elimination. Many of the algorithms are similar but with different capabilities, strengths and weaknesses. Several have multiple variants. Each has a name such as CSXCM (Common Subexpression Elimination and Code Motion), MRA (Morel-Renvoise Algorithm for partial redundancy elimination), PRE (Partial Redundancy Elimination), or LCM (Lazy Code Motion). They are collectively known as commoning algorithms. Commoning algorithms are well-known in the art and need not be further explained herein.

In most commoning algorithms, each block in a reducible region must be examined either once or twice, in order from first to last. In some other algorithms examination is performed in the order from last to first (and during that, adjacent, predecessors and successors may be examined). The examination determines which elements, expressions or instructions within a block or region should be inserted or deleted to improve performance. The first block in a loop typically requires special handling during initialization, and a special cleanup processing is needed at the end. The worst-case number of visits is O(n) where n is the number of blocks in the region. The time taken depends on that and other things (like the number of expressions in the region) but is typically 2% to 5% of total compile time.

Irreducible regions are problematic. Since there are multiple entry points, no block is first, before all others. A partial ordering is used, from one entry to the bottom, but parts of the reducible region algorithm cannot work. There are only three known algorithms. One is to process all blocks from top to bottom and for other algorithms also bottom to top, repeating this process n times. The second is to process all blocks repeatedly but stopping after a pass in which no information has changed. The third is to use a worklist, so that only nodes needing initialization or recalculation need to be processed. Either way, the worst-case number of visits is $O(n^2)$. The second way adds work to detect that a change occurred but is generally used because typically only 3 or 4 passes are needed and in large regions that makes it much faster. Even then, in programs with large irreducible loops the cost of commoning may be well over 90%, or several hundred times slower than for reducible loops. The third way adds work to sometimes reduce the number of visits, but the worst case is still $O(n^2)$.

That problem has been mostly ignored because in most situations it is rare, but in some situations (e.g., exception handling), or using computed gotos or assigned gotos, irreducible regions become very common, and in some programs the number of passes required is close to n, not 3 or 4. That makes compile speed very slow. In one example with n about 575 the number of passes needed was about 565, needing 565 (not 3 or 4) passes over 575 blocks. The problem is aggravated by the fact that larger regions tend to contain more expressions, so the total time is $O(n^3)$.

The only known solutions to avoiding spending excessive time optimizing are to convince programmers to write their programs differently, to detect large irreducible regions and simply not optimize them, to detect them and do only intra-block local optimizations, or to use the worklist approach. While those may help compile speed, all but the worklist approach can harm program execution performance. The worklist approach adds work to keep track of the worklist and may be either faster or slower.

Hence, there is a need for an automated method for optimizing irreducible region commoning.

SUMMARY OF THE INVENTION

A method for improving compile speed in irreducible code regions within a computer program is disclosed. The method comprises determining which of the code regions is irreducible, selecting, in turn, each of the regions determined to be irreducible, setting a plurality of directional indicators indicating a current processing direction, an upward processing direction and a downward processing direction, performing an optimization process on the selected region, the optimization process being performed on the selected region in an optimization direction selected as one of a top-to-bottom and a bottom-to-top processing direction, based on the current processing direction indicator, wherein the optimization process determines characteristics of the elements in the blocks, determining an influence of the characteristics of one of the elements upon characteristics of an element in another block, propagating knowledge of the influence to directly adjacent blocks, determining a next processing direction based upon the influence, wherein the next processing direction being selected from the upward processing direction and the downward processing direction, determining the direction of a next optimization pass based on the current direction indicator and the determined direction of next processing, performing the next optimization pass on the selected regions based on the determined processing direction and completing the optimization process when the determined direction of next processing, as specified by the upward processing direction and the downward processing direction fails to specify a direction of processing.

These and other features, aspects and advantages of this invention of the present invention will become better understood with reference to the following drawings, description, and claims.

DETAILED DESCRIPTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Figure 1A:
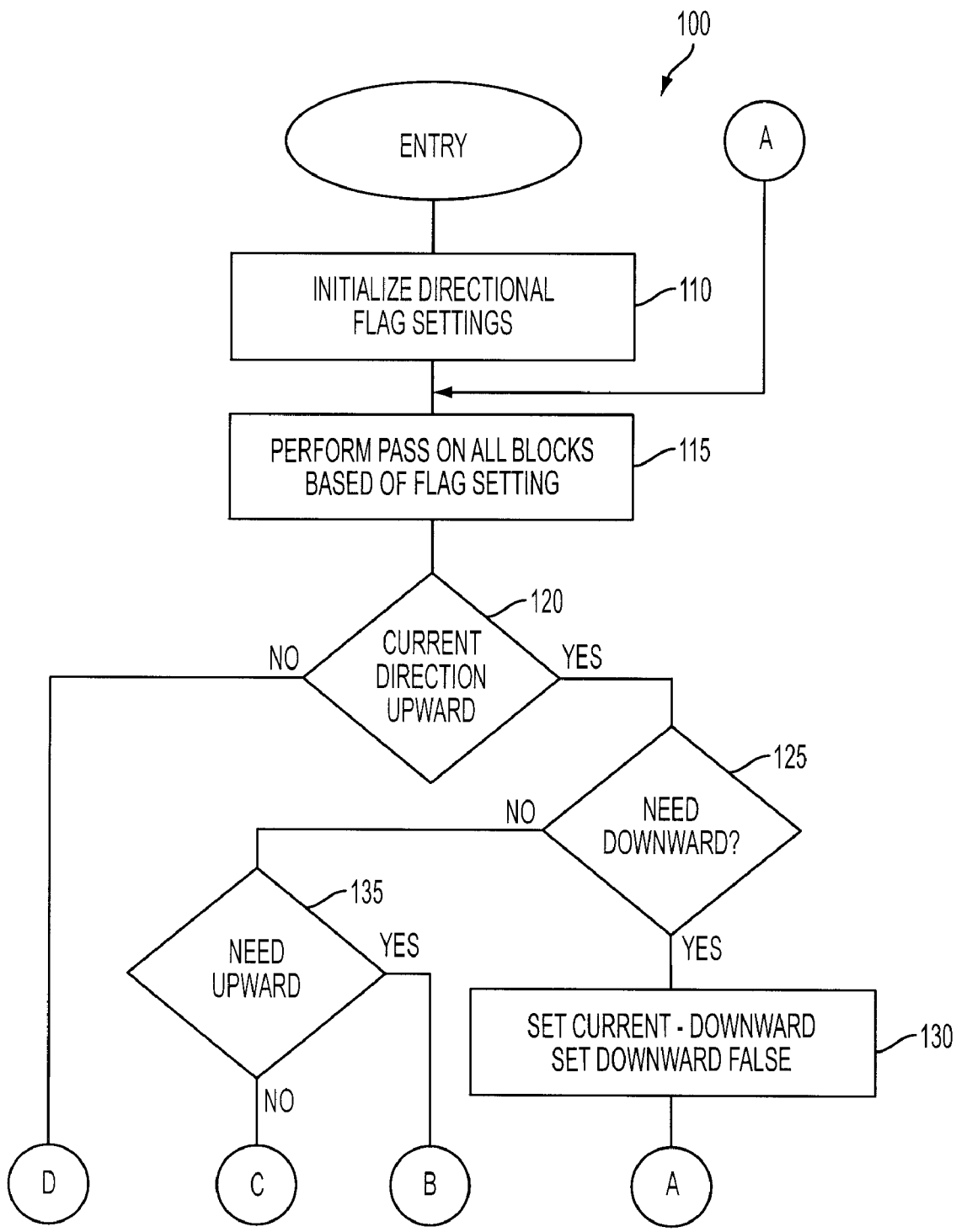
FIGS. 1A and 1B (referred to as FIG. 1) illustrate a flow chart of an exemplary method for improving irreducible region commoning compile speed, in accordance with the principles of the invention.
Figure 1B:
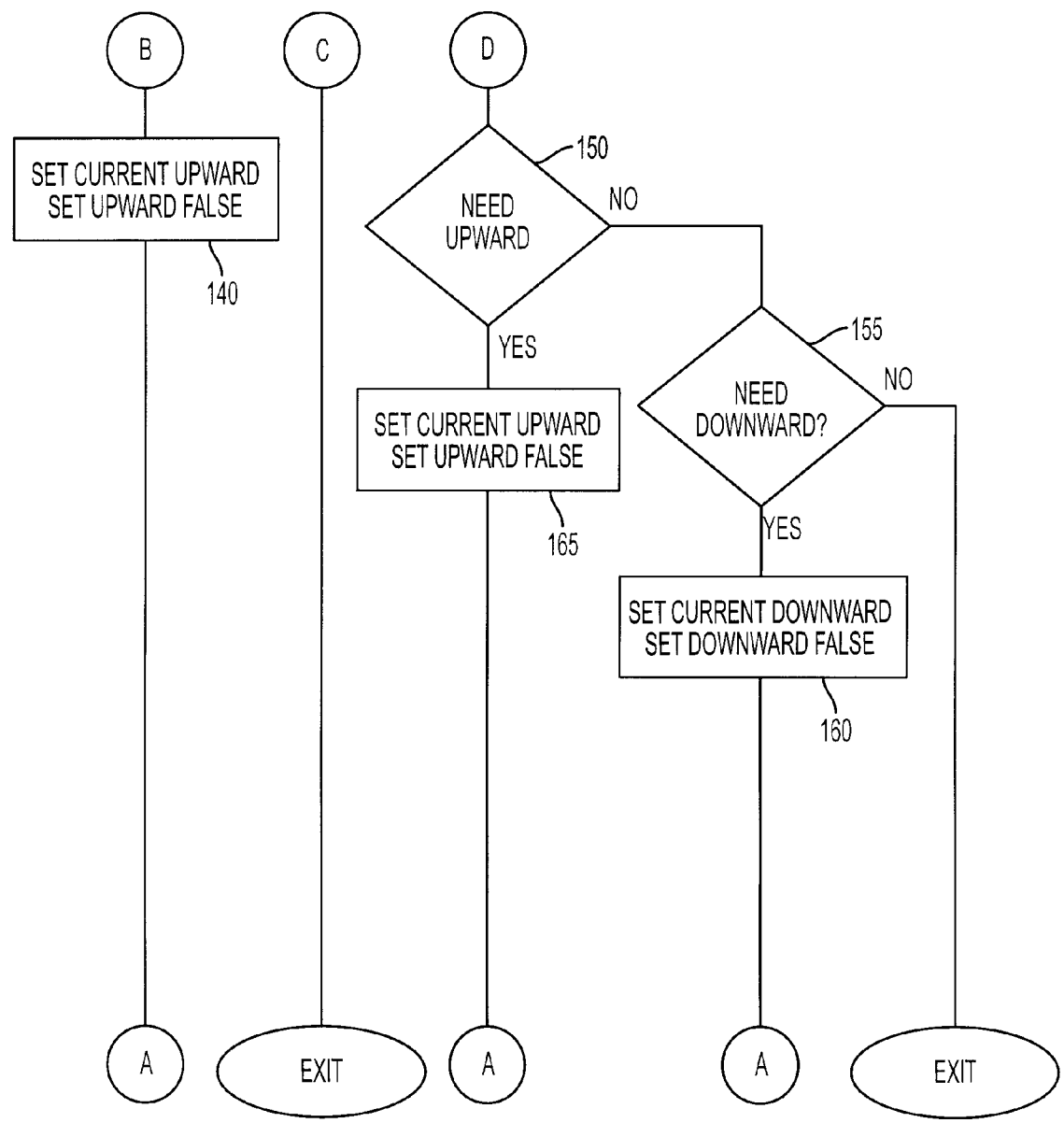

FIG. 1 illustrates a flow chart of an exemplary method 100 for improving Irreducible Region Commoning Compile Speed, in accordance with the principles of the invention. In this exemplary method, during initialization at block 110, three Boolean flags may be set. A first flag (referred to as "Need_downward") is used to record that a downward pass may be needed, and can be set to true to indicate that the first pass should be downward. A second flag (referred to as "Need_upward") may be used to record that an upward pass is needed, and may be set to false. The third flag (referred to as "current_direction") may be used to record which direction the most recent or current pass was or is. In one aspect of the invention, the current direction may be initialized to an upward direction. In addition, the Need_downward and Need_upward flags should both be initialized to true so that a pass in both directions will be done. Although two directional flags are discussed herein, it would be recognized by those skilled in the art, that the processing described herein may also be performed by a single bit or by multiple bits. The two directional bits described herein are only for the purposes of illustrating the processing described herein.

After initialization, a first pass of an iterative optimization process may be performed based on the setting of the three Boolean flags at block 115. The optimization process, as is known, operates on the blocks with the regions determined to contain irreducible code to determine whether the region may be reduced. After each pass of the optimization process is completed, the flags are tested in the following manner.

If current_direction is upward (block 120) and Need_downward is true (block 125), the current_direction flag is set to downward, and the Need_downward flag is set to false (block 130), and a downward pass started (block 115).

If current_direction is upward (block 120) and Need_downward is false (block 125), then if need upward is true (block 135), the current_direction flag is set to upward, the Need_upward flag is set to false (block 140), and an upward pass started (block 115).

If current_direction is downward (block 120) and Need_upward is true (block 150), the current_direction flag is set to upward and the Need_upward flag is set to false (block 165), and an upward pass started (block 115).

If current_direction is downward (block 120) and Need_upward is false (block 150), then if need_downward is true (block 155), the current_direction flag is set to downward and the Need_downward flag is set to false (block 160), and a downward pass started (block 115).

If neither Need_downward flag (block 155) nor the Need_upward is true (block 135), no more passes are needed and processing is complete.

In one aspect of the invention, during the optimization process, each of the elements (e.g., instructions, code) with each block within a selected region is evaluated. If it is determined that the characteristics of an element has an influence on one or more elements in another block, the knowledge of this influence is propagated to each of the adjacent blocks. The direction of the influence is further recorded. That is, if the characteristic of the element of a current block influences elements in other blocks below the current block then a downward processing direction indicator is set to true. However, if the characteristic of the element of a current block influences elements in other blocks above the current block then an upward processing direction indicator is set to true.

In another aspect of the invention, an additional array (Block_affected) may be included that includes a flag for each block indicating whether it has been affected by the calculations for other blocks; for example, when a value available on output indicates a block change. In this case, a value available on input or a value partially available on input indicate calculations for each successor block needs to be recalculated, so the Block_affected flag for each of those successors is set to true. Also all Block_affected flags must be initialized to true before the first pass (at block 110). Then when a block is reached, if its Block_affected flag is set then that block's Block_affected flag must be set false, and its calculations must be performed. The Block_affected flags of other blocks may be also be set. If the block's Block_affected flag is false, its calculations are unnecessary and should be skipped. In this case, the non-affected block cannot affect other blocks.

Figure 2:
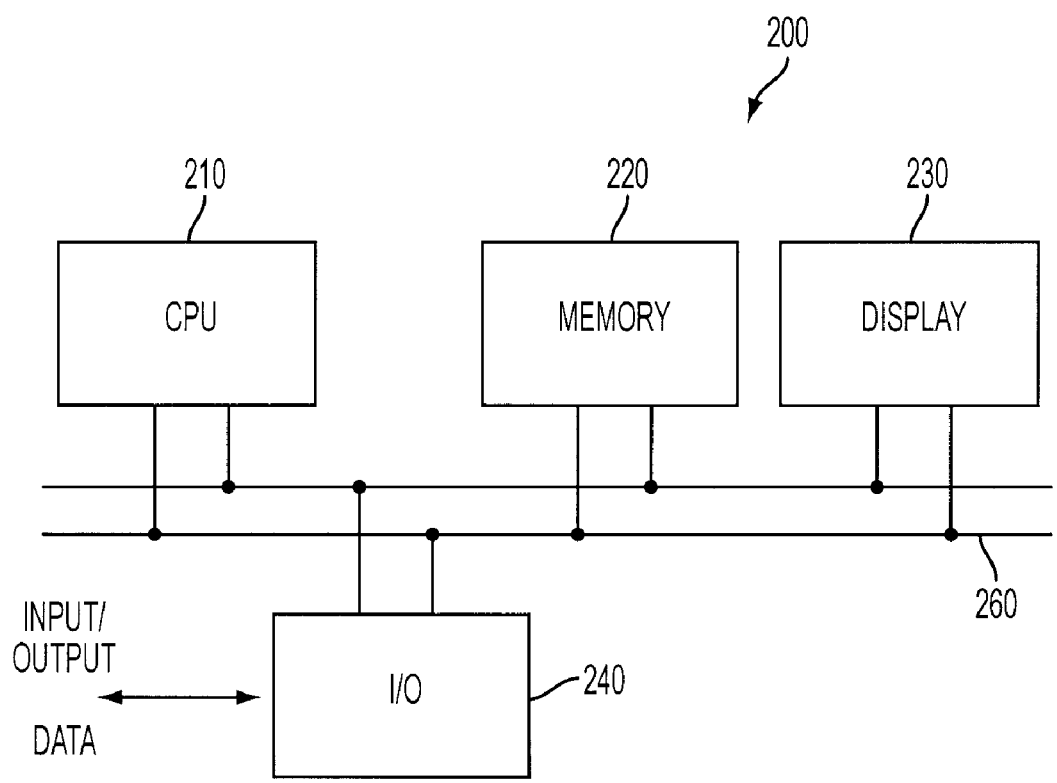
FIG. 2 illustrates a system for improving irreducible region commoning compile speed, in accordance with the principles of the invention.

FIG. 2 illustrates an exemplary system 200 for improving Irreducible Region Commoning Compile Speed, in accordance with the principles of the invention as shown in FIG. 1. In this exemplary system embodiment, a processor (CPU) 210, memory 220, display 230, and I/O device 240 may each be in communication via a communication bus 260. Processor 210 may be any type of processor that receives known inputs and performs one or more processing steps under the direction of programming instructions. Processor 210 may be CISC (complete instruction set computer) or RISC (reduced instruction set computer) type processor. Memory 220 may be, for example, a solid-state semiconductor memory represented as RAM, ROM, EPROM, Flash, etc., that may store instructions that provide instruction to processor 210. The instructions, i.e., code, may be stored in permanent memory, e.g., PROM, wherein variable or changeable data may be store in RAM.

Display 230 may be used to present a list of each block optimized.

I/O device 240 may provide a means for inputting and outputting information to and from processor 210. For example, I/O device 240 may receive information from one or more program blocks. This information may be provided to processor 210 to process each block, in turn. The results on, or influences of, each block may then be displayed on display 230. Although not shown it would be appreciated that the data may be provided from or to a network, such as a WAN, LAN, POTS and the Internet.

It would be recognized by those skilled in the art, that the invention described herein can take the form of an entirely hardware embodiment, an entirely software embodiment, or an embodiment containing both hardware and software elements. In an exemplary embodiment, the invention is implemented in software, which includes but is not limited to firmware, resident software, microcode, etc.

In this case, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

This technique is described with respect to commoning, but can also be applied with obvious modifications to other iterative data flow optimizations and algorithms, including but not limited to Value Numbering, Downwards Store Motion, Downwards Code Motion, Pointer Analysis, Intra-procedural or Interprocedural Constant Propagation, Parameter Aliasing Analysis, May Modify Analysis, May Use Analysis, Last Use Analysis, Uninitialized Variable Detection, and Binary Optimization.

It is to be understood that the specific embodiments of the invention that have been described are merely illustrative of certain applications of the principle of the present invention. Numerous modifications may be made to a system and method described herein without departing from the spirit and scope of the present invention.

What is claimed is:

1. A method, operable in a computer system, for improving compile speed in irreducible code regions within a computer program, each of said code regions composed of a plurality of code blocks, each of said plurality of code blocks containing at least one element, the method comprising:

determining which of said code regions is irreducible;

selecting, in turn, each of said code regions determined to be irreducible;

setting a plurality of directional indicators indicating a current processing direction, an upward processing direction and a downward processing direction;

performing an optimization process on the selected code region, said optimization process being performed on said selected code region in an optimization direction selected as one of a top-to-bottom and a bottom-to-top processing direction, based on said current processing direction indicator, wherein said optimization process determining characteristics of at least one of said at least one element in said plurality of code blocks;

determining an effect of a change of the characteristics of one of said at least one element in a current code block upon characteristics of at least one of said at least one element in another code block;

propagating knowledge of said effect to directly adjacent code blocks;

determining a next processing direction based upon a direction of said adjacent code blocks, with respect to said current code block, effected by changes in said current code block, wherein said determined next processing direction being selected from said upward processing direction and said downward processing direction;

determining the direction of a next optimization pass based on said current processing direction indicator and said determined direction of next processing;

performing said next optimization pass on the selected code region based on the determined next processing direction; and completing the optimization process when the determined direction of next processing, as specified by the upward processing direction and said downward processing direction, fails to specify a direction of processing.

* * * * *